Figure 1:
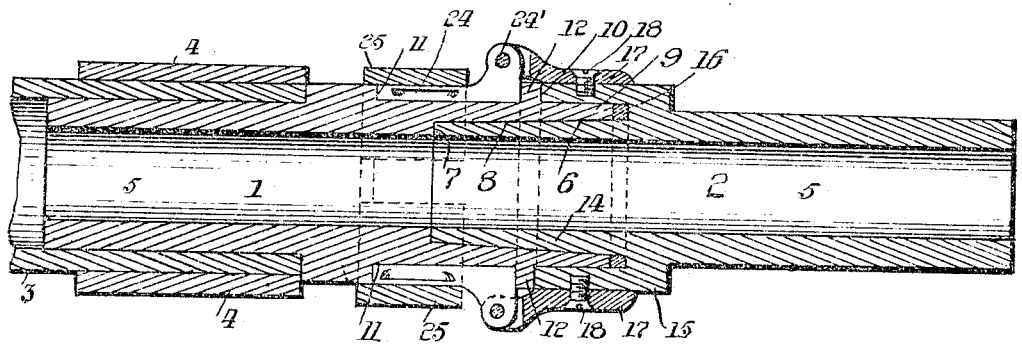

No. 781,952. PATENTED FEB. 7, 1905.
A. A. JONES.
HOSE COUPLING.
APPLICATION FILED JULY 26, 1904.

Witnesses:

Inventor
Alvey A. Jones.
By Attorneys

No. 781,952. Patented February 7, 1905.

UNITED STATES PATENT OFFICE.

ALVEY A. JONES, OF TURTLECREEK, PENNSYLVANIA.

HOSE-COUPLING.

SPECIFICATION forming part of Letters Patent No. 781,952, dated February 7, 1905.

Application filed July 26, 1904. Serial No. 218,223.

*To all whom it may concern:*

Be it known that I, ALVEY A. JONES, a citizen of the United States of America, residing at Turtlecreek, in the county of Allegheny and State of Pennsylvania, have invented certain new and useful Improvements in Hose-Couplings and the Like, of which the following is a specification, reference being had therein to the accompanying drawings.

This invention has relation to hose-couplings, and has for its object the provision of novel means for securing two sections of hose together whereby when the two sections have been once secured together it will be impossible for the same to become disconnected until released by a person manipulating the coupling.

Another object of this invention is to provide a coupling for two sections of hose which will form a non-leakable connection between the sections of hose, and I employ novel means for quickly and firmly clamping the two sections together.

Briefly described, the invention consists of providing two members, one of which is adapted to fit within the other, and upon one of said members I provide pivoted levers which are adapted to engage a collar carried by the other member, and over said levers I place a metallic band, whereby it will be impossible for the two members carrying the hose to become detached from one another.

I have constructed the coupling upon as simple lines as possible, whereby the expense of manufacture will be reduced to a minimum, at the same time providing a strong and durable construction which will withstand the rough usage to which sections of hose are generally subjected when being dragged along the street in case of fire or the like.

The above construction will be hereinafter more fully described in detail and specifically pointed out in the claim, and referring to the drawings accompanying this application like numerals of reference indicate like parts throughout the several views, in which—

Figure 2:
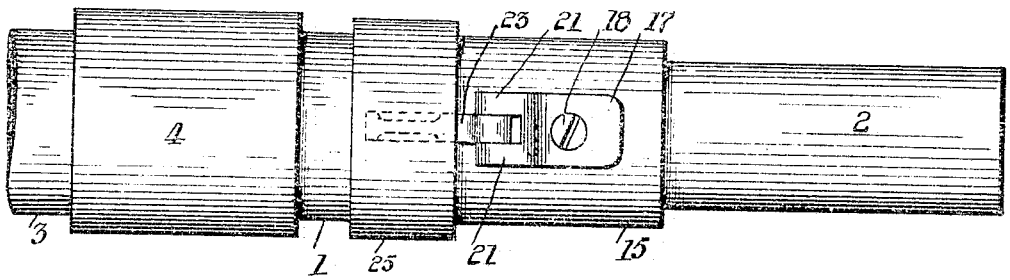
Figure 3:
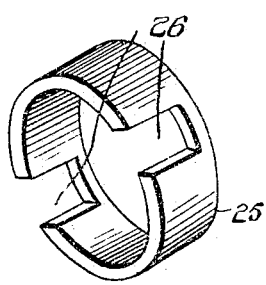
Figure 4:
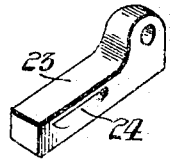
Figure 5:
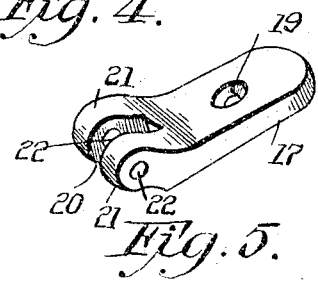

Figure 1 is a longitudinal sectional view of my improved coupling, showing a section of hose secured thereon. Fig. 2 is a top plan view of the same. Fig. 3 is a perspective view of the locking-band. Fig. 4 is a detail perspective view of one of the locking-levers, and Fig. 5 is a detail perspective view of one of the clamps to which one of the locking-levers is pivoted.

To put my invention into practice, I employ two members 1 and 2, and upon the outer ends of these members are secured the ends of the hose 3, a collar 4 being employed to fasten the sections of hose upon a member. Any other means than this shown may be employed for securing a section of hose upon the members, and I do not care to limit myself to this specific means shown. Each member is preferably made annular in form, and each member is provided with a bore 5. The member 1 has an annular recess 6, forming an annular shoulder 7 in the bore 5 of the member 1, and the sides of this recess are slightly tapered, as indicated at 8. The exterior sides of the end of the member 1 are cut away, as indicated at 9, forming an annular shoulder 10, and the sides of the member are provided with diametrically opposite recesses 11 11, a partition 12 being formed between these recesses and the cut-away portion 9 of the member 1. The end of the member 2 is tapered, as designated by the reference-numeral 14, this end being provided with an annular collar 15, and in the recess formed by the inner sides of this collar and the tapering end 14 of the member 2 is placed a gasket 16. Upon the sides of the collar 15 are secured two clamps 17 17, these clamps being arranged diametrically opposite each other and secured to collar 15 by screws 18 18. The clamp, which is clearly illustrated in Fig. 5 of the drawings, is provided with a screw-threaded aperture 19 to receive the screw 18, and the one end of the clamp is bent upwardly and cut away, as indicated at 20, forming lugs 21 21, and in these lugs are formed apertures 22 22, which are in horizontal alinement with each other. Between the lugs 21 21 is pivoted a locking-lever 23 by a pin 24', this locking-lever being provided with recesses 24 in its side, whereby the same may be readily gripped by a person desiring to disconnect the hose-sections.

The locking-lever is adapted to lie, when the two members 1 and 2 are clamped together, in the recesses 11 11, formed in the sides of the member 1, and in order to retain these locking-levers in their respective recesses a metallic band 25 is employed, which is slidably mounted upon the member 1, and when the levers are in their respective recesses this band is adapted to lie over the levers and hold the same therein. The metallic band 25 is provided with cut-away portions 26 26, whereby the levers may be placed in their respective recesses and may be again removed when it is desired, the metallic band 25 being rotated a quarter of a revolution to engage and retain the locking-levers within their respective recesses when the same have been placed therein.

The manner of connecting the two sections of hose or the members 1 and 2 together is as follows: The member 2 is adapted to fit within the member 1, the tapering end 14 of the member 2 fitting within the tapering recess of the member 1, the extreme end of the member 2 abutting against the shoulder 7 of the member 1. The collar 15 is adapted to engage over the end of the member 1, the cut-away portion 9 being provided to receive the collar, and the extreme end of the member 1 will abut against the gasket 16, mounted in the recess formed by the collar 15 and the tapering end 14 of the member 2. When the two members have been placed in horizontal alinement with each other, as illustrated in Fig. 1 of the drawings, the bore of one member registering with the bore of the other member, the locking-levers are then adapted to be swung upon their pivot to engage said levers within the recesses 12 12, and when the locking-levers have been placed in this position the metallic ring 25 is rotated until the same lies over the locking-levers and retains the same in their respective positions.

By employing the metallic band 25 I have provided novel means whereby the locking-levers may be quickly and firmly locked in their respective recesses, the engagement of these levers with said recesses firmly holding and retaining each member in engagement with the other, and by providing the interlocking ends of each member it will be seen that in conjunction with the washer or gasket 16 a non-leakable connection is formed between the hose-sections, and the merits of this form of connection will be appreciated by those skilled in the handling of hose.

While I have herein shown two locking-levers as being employed in connection with the members 1 and 2, I wish it to be understood that a plurality of these levers may be employed, the number depending upon the size of the sections of hose to be connected together, and various other changes may be made in the construction of the coupling without departing from the scope of the invention.

What I claim is—

A hose-coupling comprising two members, one of which has an interior tapered recess, and is provided exteriorly with diametrically-opposed recesses, an exterior annular flange integral with said member, the other of said members having a tapering extension fitting in the tapering seat in the first-mentioned member, an annular collar integral with said second member and projecting partially over the tapered extension forming an annular recess to receive the free end of the first-mentioned member, said collar abutting against said annular flange on the first-named member, clamps secured to diametrically opposite sides of said second member, locking-levers pivoted in said clamps and adapted to seat in the recesses of the first-mentioned member and engage at their rear ends with the flange thereon, and a sleeve rotatable on the first-mentioned member for securing the locking-levers in the recesses, and having cut-away portions to permit the entry of and removal from the recesses of the locking-levers, substantially as described.

In testimony whereof I affix my signature in the presence of two witnesses.

ALVEY A. JONES.

Witnesses:
H. C. EVERT,
E. E. POTTER.